TRANSISTORIZED ELECTRONIC RELAY

Filed Dec. 2, 1966 3 Sheets-Sheet 1

INVENTORS:
Alain M. Dupont,
Jacques L. Normand,
Pierre E. Moch
and Claude G. Rousseau
BY: Abraham A. Saffitz
ATTORNEY INVENTORS:
Alain M. Dupont,
Jacques L. Normand,
Pierre E. Moch
and Claude G. Rousseau
BY: Abraham A. Saffitz
ATTORNEY

TRANSISTORIZED ELECTRONIC RELAY

Filed Dec. 2, 1966 3 Sheets-Sheet 3

INVENTORS:
Alain M. Dupont,
Jacques L. Normand,
Pierre E. Moch
and Claude G. Rousseau
BY: Abraham A. Saffitz
ATTORNEY United States Patent Office 3,417,292
Patented Dec. 17, 1968

3,417,292

TRANSISTORIZED ELECTRONIC RELAY

Alain M. Dupont, Issy-les-Moulineaux, Jacques L. Normand, Paris, Pierre E. Moch, Sucy-en-Brie, and Claude G. Rousseau, Joinville, France, assignors to Societe Mixte pour le Development de la Technique de la Commutation dans le Domaine des Telecommunications, styled Socotel, Issy-les-Moulineaux, France, a body corporate of France Filed Dec. 2, 1966, Ser. No. 598,686
Claims priority, applications France, Dec. 4, 1965, 40,982; Nov. 29, 1966, 85,383
4 Claims. (Cl. 317—31)

The present invention relates to transistorized electronic relays and, in particular, to such relays for double current working.

Two-stage electronic relays are known, each of which comprises two transistors of the same type and which function in the manner of two monostable trigger circuits connected in series. Two-stage electronic relays are likewise known, each of which comprises transistors of opposite types and which function like two chains responding respectively to the signals of one polarity and of the other, connected in parallel between an input terminal and an output terminal.

At their output circuit, such relays deliver a current, the direction of which depends on the polarity of the signals applied to their input and consequently can serve as telegraphic relays but they do not enable their output circuit to be switched over depending on the polarity of the input signal in order to block it or to render it conductive to currents in any direction, for example alternating.

It is object of the invention to extend the possibilities for using electronic relays.

It is a specific object of the invention to provide an electronic relay which is capable, when it is conducting, of permitting the passage of the current controlled in one direction and in the other.

According to one embodiment of the invention, an electronic relay comprises two switching transistors, one NPN and the other PNP, having their emitters and their collectors connected in parallel with one another and to the terminals of the relay, two control transistors, one PNP controlling the NPN switching transistor through the base and the other NPN controlling the PNP switching transistor through the base, and means of applying, to the control transistors, a control signal with opposite directions for each of them. This electronic relay with two terminals is equivalent to an electromechanical relay having a movable contact and a fixed contact.

It will be seen that the electronic relays according to the invention use an NPN transistor and a PNP transistor both in the control stage and in the switching stage, with the object of cutting off or of "allowing to be conducting" two transistors of opposite types connected in parallel and introduced into an output circuit to be opened or closed, the cutting off or allowing to be conducting depending on the polarity of an input signal. The current in the output circuit therefore passes through one or the other of the two transistors of opposite type according to the conditions peculiar to said circuit and independent of the input signal.

Two electronic relays of the type which has just been defined may be connected in opposition, the emitters of the two switching transistors of the first relay being connected to a first terminal, the collectors of the two switching transistors of the first and of the second relay being connected to a second terminal, the emitters of the two switching transistors of the second relay being connected to a third terminal, and the control transistors at each relay are controlled in opposition in the sense that the control signal is applied in one direction to the PNP and NPN control transistors of one relay and in the opposite direction to the NPN and PNP control transistors of the other relay. This assembly of two relays is equivalent to an electromechanical relay having one movable contact and two fixed contacts.

A further specific object of the invention is to provide a telegraphic relay with two inputs controlling a teleprinter for reception and for the local control of a separate transmitter according to the telegraphic signals applied to one of the other of its inputs.

According to a second embodiment of the invention, an electronic telegraphic relay is composed of an input stage comprising two transistors of opposite types controlled in parallel through a line for receiving telegraphic signals and an output stage comprising an NPN transistor and a PNP transistor controlled respectively by the opposite type of transistor in the input stage, having their emitters respectively connected to a source of negative potential and to the movable blade of a telegraphic transmitter with two contact terminals, the one positive and the other negative, and their collectors connected together to constitute an output terminal controlling a teleprinter and further connected to the anode of a diode having its cathode connected to said movable blade from which it follows that said teleprinter records the signals received by the reception line when said movable blade of the transmitter is blocked at its positive terminal and the signals transmitted by the transmitter when the reception line is maintained at a positive potential.

Another feature of the electronic telegraphic relay of the invention is to comprise an input circuit composed of a resistor and a capacitor in parallel, which connects the bases of the two transistors of the input stage to their emitters, said resistor enabling the sensitivity of said relay to be adjusted and said capacitor introducing a delay into the unblocking of said transistor to prevent overlapping of their output signals.

The invention will now be described in detail with reference to the accompanying drawings in which.

Figure 3:
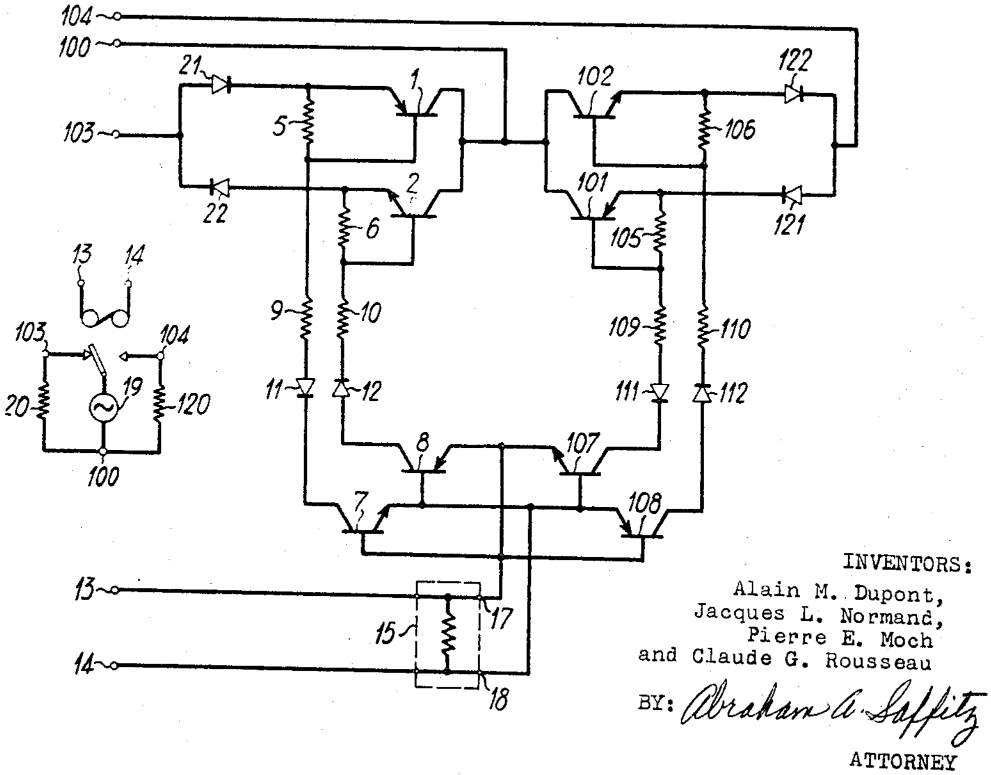
FIG. 3 illustrates an electronic relay with three terminals equivalent to an electromechanical relay with one movable contact and two fixed contacts.
Figures 6, 7:
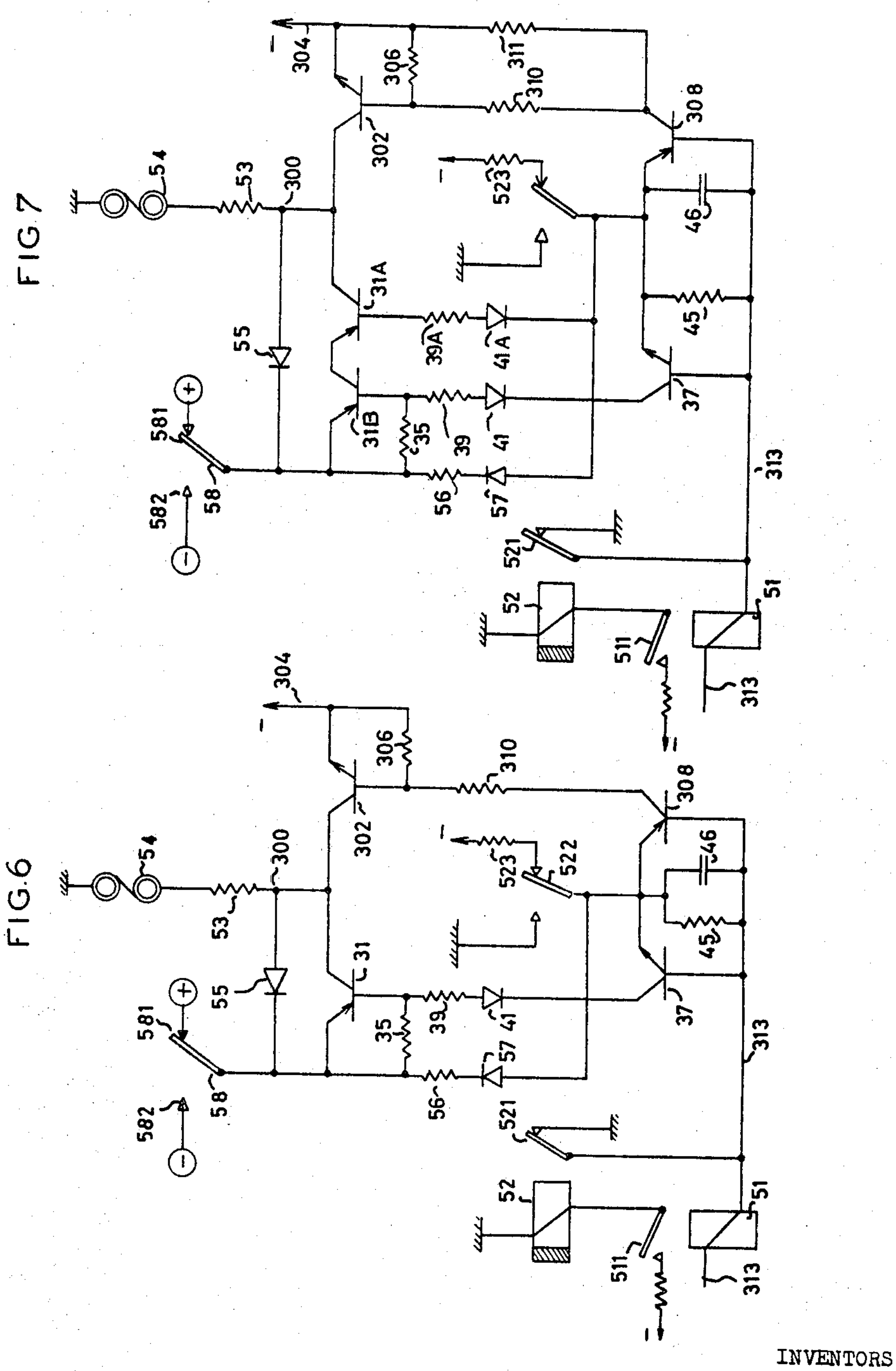

FIGS. *5a*, *5b*, *5c* illustrate different types of input circuit for the relays of FIGURES 1 to 4;

FIG. 6 is a diagram of a simplified embodiment of the relay of FIG. 3 adapted to serve as a telegraphic relay and FIG. 7 is a modification of FIG. 6.

Figures 1, 2:
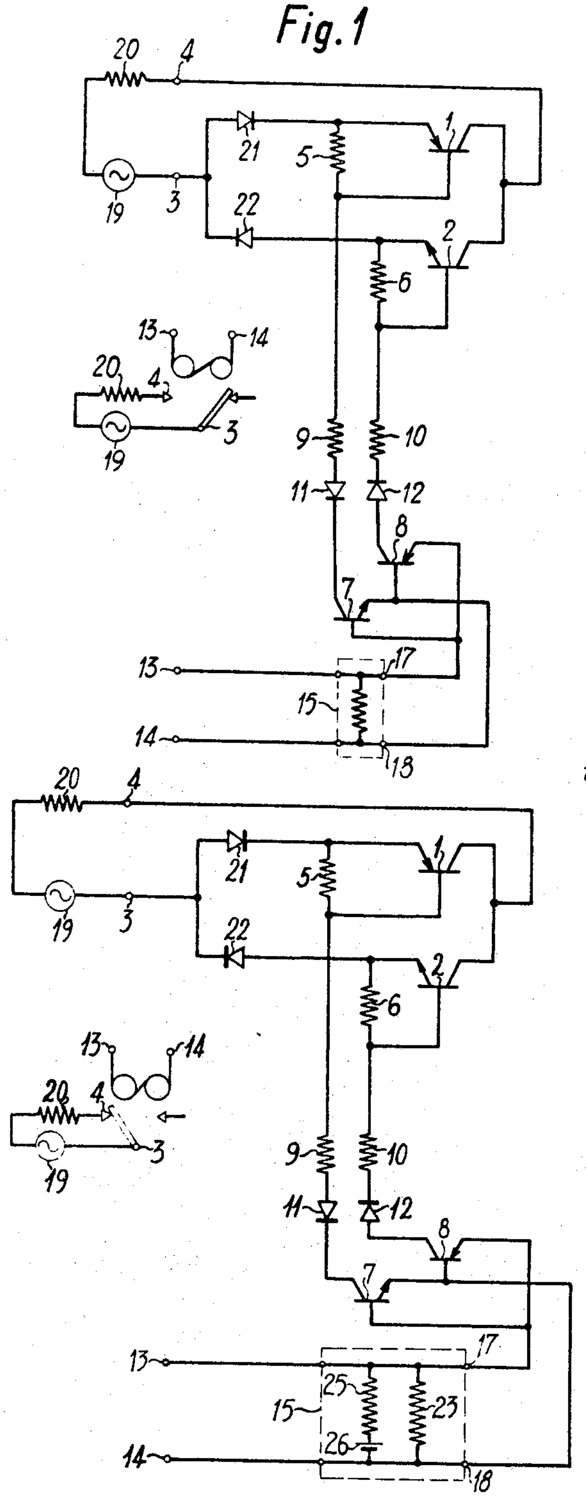
FIG. 1 illustrates an electronic relay with two terminals, equivalent to an electromechanical relay with a movable contact and a fixed contact, the contact being opened when the relay is de-energized.
FIG. 2 illustrates an electronic relay with two terminals, equivalent to an electromechanical relay with a movable contact and a fixed contact, the contact being closed when the relay is de-energized.

FIG. 1 illustrates an electronic relay wherein the controlled circuit is closed when the control circuit is fed and open when the control circuit is not fed. The equivalent electromechanical relay is shown, on a small scale, beside the electronic relay.

The switch point, equivalent to the contact of an electromechanical relay, consists of two transistors 1 and 2, the first of the PNP type and the second of the NPN type, the emitters of both of which are connected to the terminal 3 and the collectors to the terminal 4, to which terminals there is connected the circuit to be opened and closed. This circuit has been illustrated in FIG. 1 as formed by a source of alternating current 19 and a load impedance 20. According to its state, each switching transistor 1 or 2 does or does not allow the passage of a current having a given diretcion. When the relay is in the closed position, one or the other of the switching transistors is conducting according to the direction of the current in the circuit to be switched.

5 and 6 designate the bias resistors for the emitters of the transistors 1 and 2, and 21 and 22 are two diodes adapted to protect the transistors from the voltages applied in the reverse direction between emitter and collector.

The control circuit for the switch point consists of the two transistors 7 and 8, the NPN one 7 controlling the PNP transistor 1 and the other PNP one 8 controlling the NPN transistor 2. Each control transistor 7 and 8, respectively, controls, through its collector, the base of a switching transistor 1 and 2, respectively, through a resistor 9 and 10 and a diode 11 and 12, respectively. The purpose of these diodes is to protect the control transistors from the reverse voltages.

The input circuit 13–14 comprises a network 15 which, in the case of FIG. 1 (as also in FIGS. 3, 4) is assumed to consist of a simple resistor. The terminals 17 and 18 of the resistor are respectively connected to the bases of the control transistors 7 and 8. Other examples of input networks will be given hereinafter.

The operation is as follows:

When the control current is applied in the direction passing from 13 to 14, a signal appears at the terminal 17–18 of the resistor 15 and the potential of the terminal 17 is higher than that of the terminal 18. This signal unblocks the control transistors 7 and 8 and the collector currents become established if there is nothing to prevent the circulation of the current in the direction emitter to collector in the transistor 8 and the circulation of the current in the direction collector to emitter in the transistor 7. If the potential of 3 is higher than the potential of 18, a current passes through the control transistor 7 and the potential drop in the resistor 5 unblocks the switching transistor 1. On the other hand, no current enters the control transistor 8 because of the diodes 12 and 22 and the transistor 2 remains cut off. The controlled current passes through the transistor 1.

If the potential of 3 is lower than the potential of 17 (or of 18 because the potentials of 17 and 18 are very close) a current passes through the control transistor 8 and the potential drop in the resistor 6 unblocks the switching transistor 2. On the other hand, no current enters the control transistor 7 because of the diodes 11 and 21 and the transistor 1 remains cut off. The controlled current passes through the transistor 2.

When the control current is applied in the direction passing from 14 to 13, the control transistors 7 and 8, and consequently the switching transistors 1 and 2, remain cut off.

When no control current is applied to the electronic relay, the transistors 7, 8, 1 and 2 likewise remain cut off.

The operation of the electronic relay in FIG. 1 may be summarized thus:

| Current in the input circuit | Condition input circuit output circuit | State of the output circuit |
|---|---|---|
| 13→14 (state A) | $Pot_3>pot_{18}$ | 1 conducting, 2 cut off. |
| | $Pot_3<pot_{18}$ | 1 cut off, 2 conducting. |
| 14→13 (state B) (state not used unless the relay is polarized) and no current (state C) | Immaterial | 1 and 2 cut off. |

FIG. 2 illustrates a polarized electronic relay wherein the controlled circuit is closed when the control circuit is not fed.

The relay in FIG. 2 differs from that in FIG. 1 by its network 15 which comprises a circuit for restoring to a preferred position in the event of absence of current in the input circuit. The resistor 23 plays the part of the resistor in the network 15 in FIG. 1. The restoring circuit comprises a resistor 25 of high value and a source of voltage 26 in such a manner that, in the absence of current in the input circuit, the resistor 23 is traversed by a current which produces the same effect as an input current in the direction from 13 to 14. The transistors 7 and 8 are then conducting and the table of operation is as follows:

| Current in the input circuit | Condition input circuit output circuit | State of the output circuit |
|---|---|---|
| 13→14 (state A) or no current (state C) (state A not used unless the relay is polarized). | $Pot_3>pot_{18}$ | 1 conducting, 2 cut off. |
| | $Pot_3<pot_{18}$ | 1 cut off, 2 conducting.. |
| 14→13 (state B) | Immaterial | 1 and 2 cut off. |

The relays of FIGS. 1 and 2 are polarized relays in the sense that a single direction of the current in the input circuit allows the passage of an output current (the other direction corresponding to an absence of output current). If one of the directions of input current is not used, ordinary nonpolarized relays are obtained, that in FIG. 1 (current not used in the direction 14–13) closed when operative and open when inoperative, that in FIG. 2 (current not used in the direction 13–14) closed when inoperative and open when operative.

FIG. 3 illustrates an assembly of two electronic relays of the type in FIG. 1 connected in opposition with a centre output point. The members of one of the electronic relays are designated by the same reference numerals as in FIG. 1 and the numerals of the members of the other are deduced from the numerals of the members of the first by adding 100 to these latter members. It will be seen that the control signal at the terminals 17–18 of the network 15 is applied in one direction to the control transistors 7–8 of the first electronic relay and in the reverse direction to the control transistors 107–108 of the second electronic relay. The following conditions of operations result:

| Current in the input circuit | Condition input circuit output circuit | State of the output circuit |
|---|---|---|
| Input current in the direction 13–14. | $Pot_{103}>pot_{18}$ | 1 conducting, 2 cut off' 101 cut off, 102 cut off' |
| | $Pot_{103}<pot_{18}$ | 1 cut off, 2 conducting, 101 cut off, 102 cut off. |
| Input current in the direction 14–13. | $Pot_{104}>pot_{17}$ | 1 cut off, 2 cut off, 101 conducting, 102 cut off. |
| | $Pot_{104}<pot_{17}$ | 1 cut off, 2 cut off, 101 cut off, 102 conducting. |
| No input current | | 1, 2, 101, 102 cut off. |

The electronic relay in FIG. 3 is equivalent to a relay with a changeover contact which is illustrated on a small small in FIG. 3. 19 is a source of alternating current and 20 and 120 are two loads which can be switched over.

Figure 4:
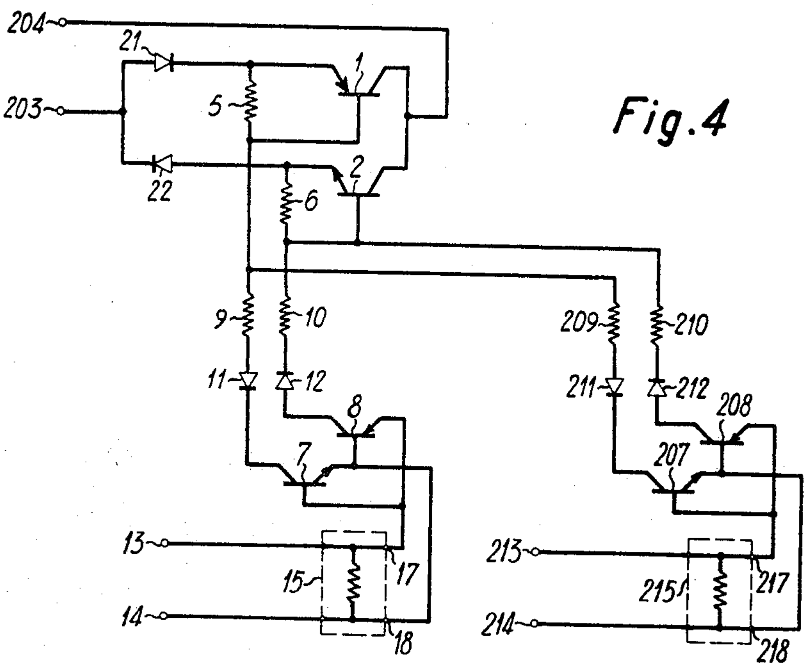
FIG. 4 illustrates an electronic relay with two control systems, the function of which is equivalent to that of a multiple-winding electromechanical relay or to that of two electromechanical relays controlling two contacts in parallel.

FIG. 4 illustrates an electronic relay of the type in FIG. 1 but equivalent to an electromechanical relay with two windings.

In FIG. 4, the reference numerals of the switching transistors are the same as in FIG. 1, but the output terminals of the relay are numbered 203 and 204. The members of the first two control transistors have the same numerals as in FIG. 1 and the members of the other two control transistors have reference numerals increased by 200 respectively. It is easy to see that the states A', B', C' of the first control assembly and the states A'', B'', C'' of the second control assembly are combined in the following manner to give one of the two following states at the output:

| 1st control assembly | 2nd control assembly | Equivalent control to that of a circuit in Fig. 1 | State of the output circuit |
|---|---|---|---|
| A' | B" | A | Nonblocking. |
| A' | C" | A | Do. |
| B' | A" | A | Do. |
| B' | B" | B | Blocking. |
| B' | C" | B | Do. |
| C' | A" | A | Nonblocking. |
| C' | B" | B | Blocking. |
| C' | C" | C | Do. |

Blocking signifies switching transistors cut off.
Nonblocking signifies switching transistors allowed to be conducting.

The case *A'+A"* is more complex and is summarized in the following table:

| Condition—Input circuit, Output circuit | State of the output circuit |
|---|---|
| $Pot_{17} < pot_{217} < pot_{203}$ or | 1 is allowed to be conducting, $pot_{203} > pot_{204}$, 1 conducting. |
| $Pot_{217} < pot_{17} < pot_{203}$ | $Pot_{203} < pot_{204}$, 1 cut off, 2 cut off. |
| $Pot_{17} < pot_{203} < pot_{217}$ or | 1 and 2 are allowed to be conducting, $pot_{203} > pot_{204}$, 1 conducting, 2 cut off. |
| $Pot_{217} < pot_{203} < pot_{17}$ | $Pot_{203} < pot_{204}$, 1 cut off, 2 conducting. |
| $Pot_{203} < pot_{17} < pot_{217}$ or | 1 cut off, 2 allowed to be conducting |
| $Pot_{203} < pot_{217} < pot_{17}$ | $Pot_{203} > pot_{204}$, 2 cut off, $Pot_{203} < pot_{204}$, 2 conducting. |

Figure 5A:
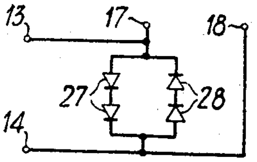
Figure 5B:
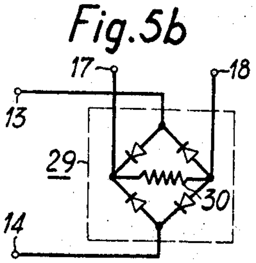
Figure 5C:
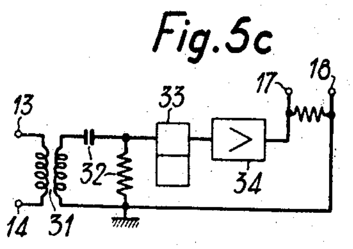

In FIGS. 1, 3 and 4 it was assumed that the network of the input circuit which converts the input current into a control signal was a resistor. In FIG. 2, the network 15 comprises a restoring circuit to a preferred position. The network 15 may assume other forms according to the requirements. FIGS. 5*a*, 5*b* and 5*c* correspond to three specific examples.

FIG. 5*a* illustrates a limiting network for the control signal, composed of two parallel-connected sets of diodes connected in series 27 and 28.

FIG. 5*b* illustrates a network enabling the relay to be depolarized, that is to say enabling the control signal to be given a unidirectional polarity whatever the direction of the current in the control circuit. It is composed of a bridge of diodes 29 and of a resistor 30 in the diagonal of this bridge.

FIG. 5*c* illustrates a network enabling the control circuit and the controlled circuit to be decoupled from the point of view of the direct current. It comprises an impulse transformer 31, a differentiating circuit 32, a monostable trigger circuit 33 and an amplifier 34.

FIG. 6 illustrates a telegraphic relay which is derived from the switching relay of FIG. 3 by eliminating on the one hand the transistors 101, 107, the resistors 105, 109 and the diodes 11, 121, and on the other hand the transistors 2, 8, the resistors 6, 10 and the diode 12.

As can be seen in FIG. 6, the receiving wire 313 for the telegraphic modulation is connected to the bases of two transistors, one, 37, of the NPN type, the other, 308, of the PNP type, and connected to their emitters by a parallel circuit composed of a resistor 45 and a capacitor 46. A conventional supervisory unit consists of a supervisory relay 51, the energizing winding of which is connected in series into the line 313 and an auxiliary slow-release relay 52. The relay 51 is energized when the line 313 is at the normal positive potential and then operates the relay 52 through a make contact 511. The relay 51 follows the telegraphic modulation and releases every time a negative potential is applied to the line, while the relay 52 only becomes inoperative again if this negative potential exceeds a predetermined duration, for example 400 milliseconds. The relay 52 has a break contact 521 which connects the line 313 to earth and a make-and-break contact 522 which connects the emitters of the transistors 37 and 308 to the negative pole of the common telegraphic battery by means of a resistor 523 when the auxiliary relay 52 is inoperative and to earth when it is operative.

The collector of the transistor 308 is connected, by means of a resistor 310, to the base of an NPN transistor 302, the base being itself connected, by means of a resistor 306, to its emitter and to the negative pole of the common battery.

The collector of the transistor 37 is connected, by means of a diode 41 and of a series resistor 39, to the base of a PNP transistor 31, which base is itself connected to its emitter through a resistor 35. The collectors of the transistors 31 and 302 are jointly connected to an output terminal 300 connected on the one hand by means of a resistor 53 to a utilization device 54 which may be the receiving electromagnet of a teleprinter, on the other hand, by means of a diode 55, to the emitter of the transistor 31.

The emitter of the transistor 31 is further connected, through a resistor 56 and a diode 57 in series to the emitters of the transistors 37, 308 and is connected directly to the movable blade 58 of a telegraphic transmitter. When the device of FIG. 6 is used to receive a telegraphic modulation arriving by the receiving channel 313, the movable blade of the transmitter is locked on to the positive terminal 581. In these circumstances, when the line 313 is in the normal state, that is to say connected to earth through the break contact 521 of the relay 52, the emitters of the transistors 37, 308 are brought to the negative potential of the common battery through the break contact 522. The potential drop across the terminals of the resistor 45, that is to say between the bases and emitters of the transistors 37 and 308, unblocks the first and cuts off the second. In consequence, the transistor 302 is cut off and the unblocked transistor 31 transmits the positive telegraphic potential applied to its emitter to the output terminal 300.

When the line 313 is in service, the relay 52 is operated through the relay 51, the positive telegraphic potential is applied to the bases of the transistors 37, 308 and the earth potential to their emitters. The positive telegraphic polarity of the transmitter 58 is transmitted to the ouput terminal 300 through the transistor 31.

When the negative telegraphic potential is applied to the line 313 in a discontinuous manner, because of the telegraphic modulation, the relay 52 remains operative. The potential drop in the resistor 45 between the emitters and the bases of the transistors 37, 308 cuts off the NPN transistor 37 and unblocks the PNP transistor 308 in such a manner that the transistors 31 and 302 are respectively cut off and conducting. The negative telegraphic potential applied to the emitter of the transistor 302 is transmitted by the latter to the output terminal 300.

When the device in FIG. 6 is used in conjunction with the transmitter, the movable blade 58 of which passes from the terminal 581 at the positive telegraphic potential to a terminal 582 at the negative telegraphic potential in accordance with the modulation to be transmitted, the positive telegraphic potential is permanently applied to the receiving line 313.

In these circumstances, when the potential of the signal emitted by the transmitter is positive, a positive signal is applied to the output terminal 300 by the transistor 31 in the same manner as during reception and when the signal emitted is negative, the transistor 31 is cut off and the negative polarity of the terminal 582 is transmitted to the output terminal 300 and to the electromagnet 54 of the teleprinter through the diode 55, the orientation of which is adapted for this purpose. When this negative polarity is emitted, unbalance between the consumptions from the positive and negative batteries is avoided by creating a compensating flow through the resistor 56 and the diode 57, the purpose of which is to prohibit the positive signals emitted by the transmitter or resulting from the reception of a positive element over the line 313 from utilizing this earth-return circuit. The diode 41 protects the transistor 37 which it prevents from effecting an output in reverse. The resistor 45 likewise serves a protective purpose for the transistors 37 and 308. It prevents their base from being at an indeterminate potential which would consequently be dangerous to their preservation, when the line 313 is interrupted. Furthermore, it enables the sensitivity of these transistors to be adjusted by fixing their bias voltages. The purpose of the capacitor 46 is to delay the unblocking of the transistors 37 and 308 on the reversals in the polarity of the incoming modulation in order to prevent overlapping between the output signals from the transistors 31 and 302.

FIG. 7 shows a modification of the device in FIG. 6 from which it differs only in the replacement of the transistor 31, the conditions of operation of which require high performances, by two PNP transistors 31A, 31B carrying lower voltages, and in the addition of the ensuing protection and balancing circuits. The transistor 31A is connected in series between the collector of the transistor 31B and the output terminal 300, its base being connected to the emitters of the transistors 37, 308 through a resistor 39A and a diode 41A in series. The emitter and base circuits of the transistor 31B are identical with those of the transistor 31. The diode 41A protects the emitter-to-base junction of the transistor 31A against reverse bias under excessive voltage. A resistor 311 connecting the collector of the transistor 308 to the emitter of the transistor 302 balances the flow which is established through the resistors 39 and 39A in the case of receiving a positive signal, for the case of receiving a negative signal.

The operation of the device in FIG. 7 is similar to that of FIG. 6, the unblocking of the transistor 37 through the reception of a positive signal leading to the unblocking of the transistor 31B under the same conditions as for the transistor 31, and the positive telegraphic potential transmitted by the transistor 31B to the emitter of the transistor 31A unblocking the latter, the base of which is biassed at earth potential. The resistors 39 and 39A are then traversed by a current which balances the current passing through the resistors 310, 311 on the reception of a negative signal in such a manner that the output of the telegraphic battery is substantially constant.

What we claim is:

1. A two-terminal electronic relay composed of an input stage comprising a PNP and a NPN control transistors and means for applying a control signal to said control transistors with opposite directions for each of them, and an output stage comprising a NPN and a PNP switching transistors respectively controlled by the transistor of the opposite type in the input stage, said switching transistors having their emitters and their collectors connected in parallel to one another and to the terminals of said relay whereby the same is equivalent to an electromechanical relay having a movable contact and a fixed contact.

2. A three-terminal electronic relay composed of a first and a second two-terminal electronic relays according to claim 1 connected in opposition, the emitters of the two switching transistors of said first two-terminal relay being connected to a first terminal, the emitters of the two switching transistors of said second two-terminal relay being connected to a second terminal, and the collectors of the four switching transistors of said first and second two-terminal relays being connected to a third terimnal, means for applying said control signal in one direction to the PNP control transistors of one of said two-terminal relays and to the NPN control transistor of the other two-terminal relay, and in the opposite direction to the NPN and PNP control transistors of said two-terminal relays respectively, whereby said three-terminal electronic relay is equivalent to an electromechanical relay having one movable contact and two fixed contacts.

3. A three terminal telegraphic relay composed of an input stage comprising two control transistors of opposite types controlled in parallel through a line for receiving telegraphic signals, and an output stage comprising two switching transistors of opposite types respectively controlled through the control transistor of the opposite type in the input stage, said switching transistors having their emitters respectively connected to a negative source of potential and to the movable blade of a transmitter with two contact terminals, the one positive and the other negative, and their collectors connected together to an output terminal controlling a teleprinter and further connected to the anode of a diode having its cathode connected to said movable blade, whereby said teleprinter records the signals received by said receiving line when said movable blade is blocked at its positive terminal and the signals emitted by the transmitter when the receiving line is maintained at a positive potential.

4. A three terminal telegraphic relay according to claim 3 wherein said input stage comprises an input circuit composed of a resistor and a capacitor in parallel which connects the bases of the two control transistors to their emitters, said resistor enabling the sensitivity of said telegraphic relay to be adjusted and said capacitor introducing a delay in the unblocking of said transistors in order to prevent overlapping of their output signals.

References Cited

UNITED STATES PATENTS

| | | | |
|---|---|---|---|
| 3,189,758 | 6/1965 | Bell | 307—255 X |
| 3,231,753 | 1/1966 | Brown | 307—255 X |
| 3,246,247 | 4/1966 | Grindle | 307—255 X |
| 3,287,620 | 11/1966 | Tuszynski | 307—255 X |

JOHN F. COUCH, *Primary Examiner.*

J. D. TRAMMELL, *Assistant Examiner.*

U.S. Cl. X.R.

321—2, 14; 317—36